United States Patent
Lee et al.

(10) Patent No.: US 8,387,103 B2
(45) Date of Patent: Feb. 26, 2013

(54) VIDEO SERVER DEVICE FOR CLOSED CIRCUIT TELEVISION

(75) Inventors: Hsun-Hsien Lee, Taoyuan County (TW); Yong-Lin Zhang, Kaohsiung (TW)

(73) Assignee: Gemtek Technology Co., Ltd., Hsinchu Industrial Park, Hukou, Hsinchu (TW)

( * ) Notice: Subject to any disclaimer, the term of this patent is extended or adjusted under 35 U.S.C. 154(b) by 554 days.

(21) Appl. No.: 12/647,548

(22) Filed: Dec. 28, 2009

(65) Prior Publication Data

US 2011/0162026 A1  Jun. 30, 2011

(51) Int. Cl.
*H04N 7/173* (2011.01)
(52) U.S. Cl. ...................................... 725/105
(58) Field of Classification Search .......... 725/105–134; 348/143
See application file for complete search history.

(56) References Cited

U.S. PATENT DOCUMENTS

| 6,452,924 | B1 * | 9/2002 | Golden et al. | 370/352 |
| 2006/0019629 | A1 * | 1/2006 | Berson et al. | 455/402 |
| 2006/0103726 | A1 * | 5/2006 | Hertrich et al. | 348/143 |

* cited by examiner

*Primary Examiner* — Chieh M Fan
*Assistant Examiner* — Akshay Trehan
(74) *Attorney, Agent, or Firm* — Winston Hsu; Scott Margo

(57) ABSTRACT

A video server device provides digitization and networking functions to a CCTV camera. To make installation of a video server device easier, the video server device includes a network connector for carrying first data signals, second data signals, and direct current power, an interface circuit including transformers for splitting the data signals and the power signals and/or traces for carrying the direct current, a DC/DC converter for tapping the direct current power from the transformers and/or the traces of the network connector for generating a first voltage source, and an output power connector for providing the fourth voltage source to the CCTV camera.

12 Claims, 4 Drawing Sheets

VIDEO SERVER DEVICE FOR CLOSED CIRCUIT TELEVISION

BACKGROUND OF THE INVENTION

1. Field of the Invention

The present invention relates to closed circuit television, and more particularly, to a video server device with a power port for powering a closed circuit television camera.

2. Description of the Prior Art

Closed-circuit television (CCTV) differs from broadcast television in that video signals captured by CCTV cameras are viewable only at specified locations. CCTV is utilized by banks, schools, and even governments to prevent crimes, such as theft, and as an aid to law enforcement officials in solving crimes. CCTV may also be utilized in plants, where conditions are unsafe for a human observer to be present, but monitoring of events is necessary.

As Internet infrastructure has grown in scale, and network equipment costs have come down, Internet Protocol cameras (IPCAMs) are growing in popularity as a potential replacement for traditional CCTV cameras. IPCAMs combine digital video capture technology with data networking technology to provide remote access and control of the IPCAM. An IPCAM may utilize a digital sensor to capture digital video signals, and a network transceiver for transmitting the digital video signals over a network connection to another networked device, such as a personal computer, or a monitoring station. The network transceiver may also receive control signals for controlling pan, tilt, and zoom (PTZ) of the IPCAM. The digital video signals and the control signals may be transmitted/received to/from the other networked device over a wired network connection or a wireless network connection.

Although IPCAMs provide many benefits to users, much security camera infrastructure utilizing traditional CCTV technology already exists. To provide the networking advantages of IPCAM technology to an existing CCTV system, a video server may be installed alongside each CCTV camera. The video server may include digitization circuitry for receiving analog video signals from the CCTV camera, and converting the analog video signals into digital video signals. The video server may also include network circuitry for serving the digital video signals through a network connection. Thus, a traditional CCTV camera video signal feed may be viewed through the Internet by connecting to the video server.

Please refer to FIG. 1, which is a diagram of a video server 100. The video server 100 is connected to a CCTV camera 110 through a video line for receiving analog video signals from the CCTV camera 110. The CCTV camera 110 further requires power to operate, and thus is connected to a power socket 120 through a power line for receiving direct current power, e.g. 12 Volts. When installing the video server 100, the power socket 120 may not be conveniently located in the vicinity of the CCTV camera 110. Thus, it may be necessary to spend time trying to find the power socket 120, which may make installation both difficult and inconvenient. Further, if the power socket 120 is located far from the CCTV camera 110, installation becomes even more of a problem, increasing length of a power cable used for connecting the CCTV camera 110 to the power socket 120.

SUMMARY OF THE INVENTION

A video server device for receiving video signals from a CCTV camera and providing power to the CCTV camera comprises a network connector, and interface circuit, a first DC/DC converter, and an output power connector. The network connector comprises a first wire pair for carrying first data signals and power and a second wire pair for carrying second data signals and power. The interface circuit comprises a first transformer for splitting direct current and data signals of the first wire pair, and a second transformer electrically connected to the second wire pair for splitting direct current and data signals of the second wire pair. A center-tap of the first transformer and a center-tap of the second transformer form a current circuit. The first DC/DC converter has a first input terminal electrically connected to the center-tap of the first transformer, a second input terminal electrically connected to the center-tap of the second transformer, and an output terminal for outputting a fourth voltage source. The output power connector has an input terminal electrically connected to the output terminal of the first DC/DC converter for receiving the fourth voltage source, and an output terminal for providing the fourth voltage source to the CCTV camera.

A video server device for receiving video signals from a CCTV camera and providing power to the CCTV camera comprises a network connector, and interface circuit, a first DC/DC converter, and an output power connector. The network connector comprises a first wire pair for carrying first data signals, and a second wire pair for carrying second data signals. The network connector comprises a first spare wire pair and a second spare wire pair for carrying power. The interface circuit is electrically connected to the network connector for merging the first spare wire pair into a first trace for carrying direct current at a first voltage level, and merging the second spare wire pair into a second trace for carrying direct current at a second voltage level. The first trace and the second trace form a current circuit. Voltage difference between the first voltage level and the second voltage level may then be used to form the first voltage source, e.g. 48 Volts. The first DC/DC converter has a first input terminal electrically connected to the first trace and a second input terminal electrically connected to the second trace. The first DC/DC converter converts first voltage source to a fourth voltage source, and outputs the fourth voltage source. The output power connector has an input terminal e to the output terminal of the first DC/DC converter for receiving the fourth voltage source, and an output terminal for providing the fourth voltage source to the CCTV camera.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
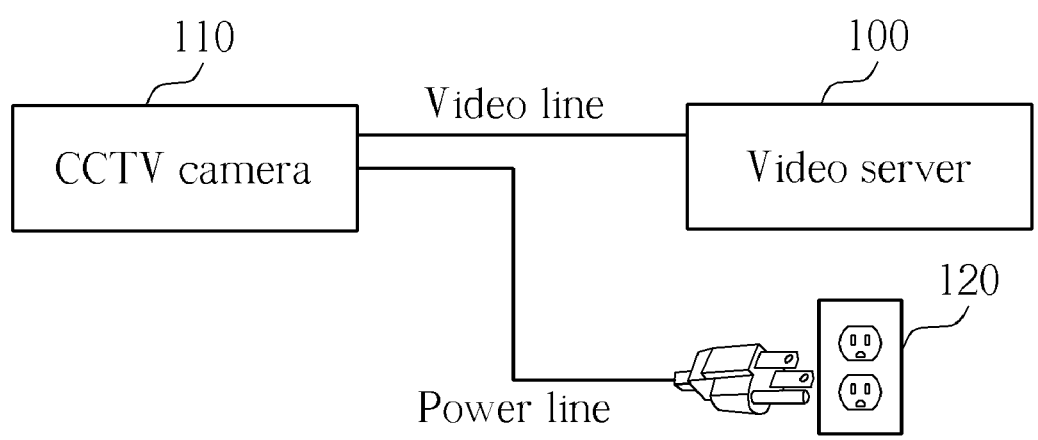
FIG. 1 is a diagram of a video server connected to a CCTV camera.
Figure 2:
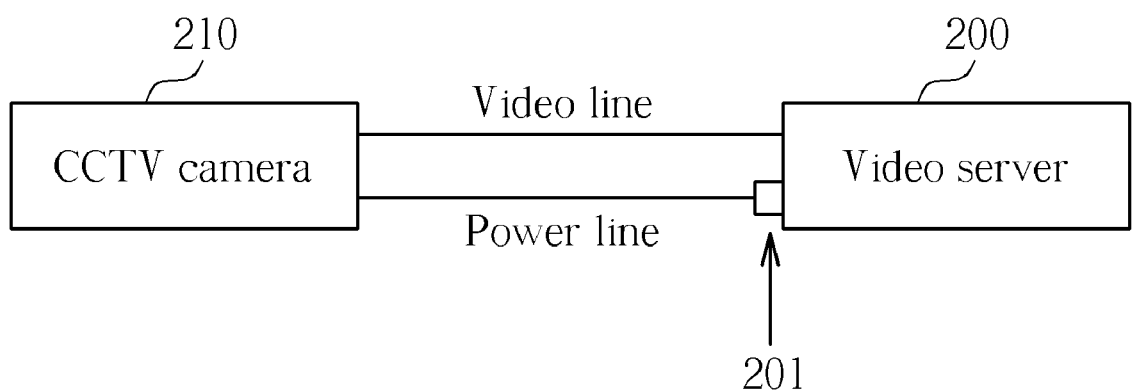
FIG. 2 is a diagram of a video server connected to a CCTV camera according to an embodiment of the present invention

Please refer to FIG. 2, which is a diagram of a video server 200 connected to a CCTV camera 210 according to an embodiment of the present invention. The video server 200 may be a device for receiving video signals from a video camera, such as the CCTV camera 210, and providing power to the CCTV camera. The video server 200 and the CCTV camera 210 may form a networked camera system. The video server 200 may be connected to the CCTV camera 210 through a video line for receiving video signals from the CCTV camera 210. The video server 200 may comprise a power connector 201 for providing power, e.g. 12 Volts direct current (DC) power, to the CCTV camera 210. The CCTV camera 210 may receive the power from the video server 200 through the power connector 201 and a power line, such as a power cable.

Figure 3:
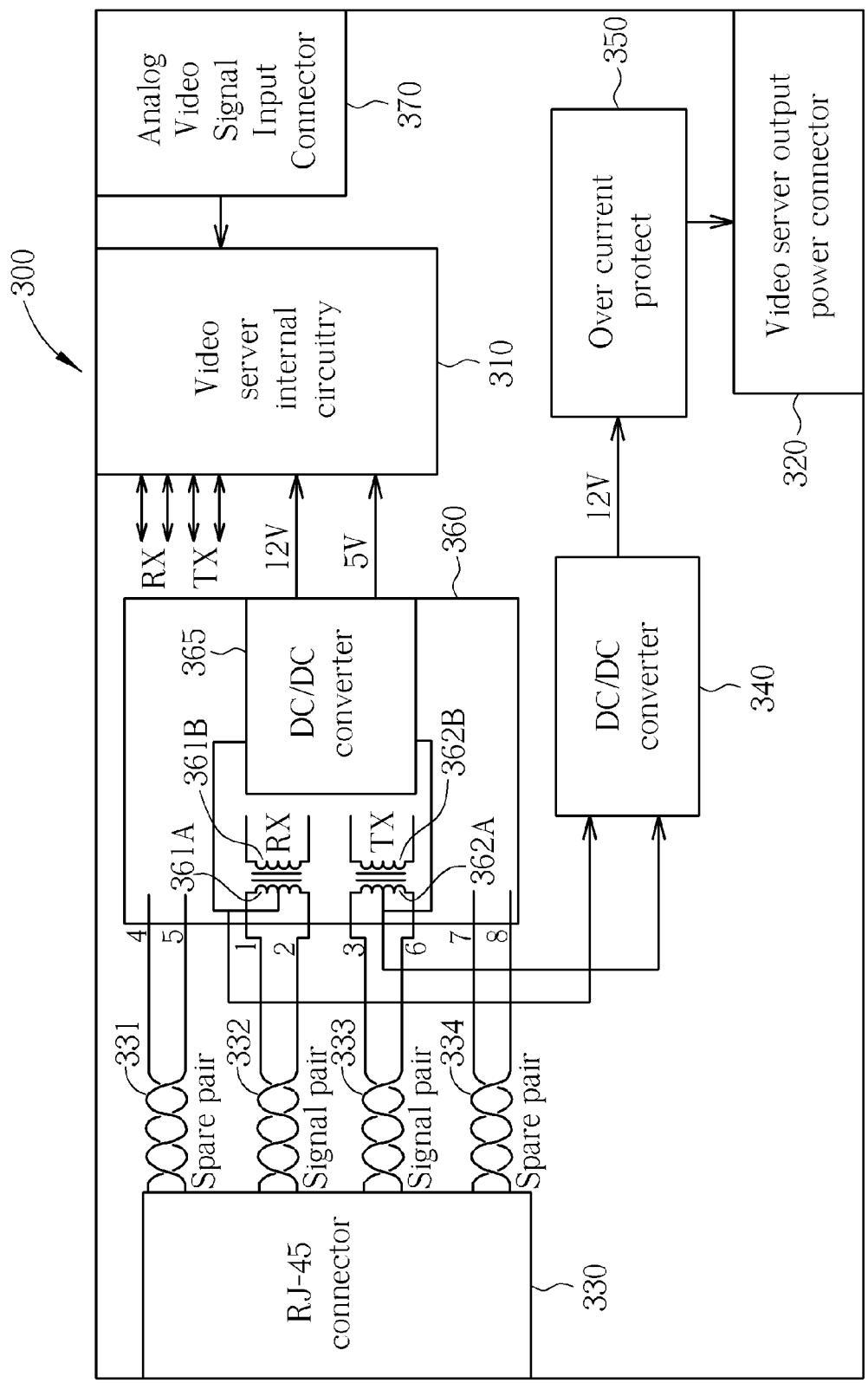
FIG. 3 is a diagram of a first embodiment of the video server of FIG. 2.

Please refer to FIG. 3, which is a diagram of a video server 300 according to a first embodiment. The video server 300 may be utilized as the video server 200 in the networked camera system shown in FIG. 2. The video server 300 may comply with a Power over Ethernet (PoE) standard, such as IEEE 802.3af-2003, and may comprise video server internal circuitry 310, an output power connector 320, a network connector 330, a first DC/DC converter 340 for providing power to a CCTV camera, such as the CCTV camera 210, an over-current protection circuit 350, and a PoE interface 360. The PoE interface 360 may include a second DC/DC converter 365 for providing power to the video server internal circuitry 310. The video server 300 may further comprise an analog video signal input connector 370 electrically connected to the video server internal circuit 310 and the CCTV camera. The analog video signal input connector 370 may be a VGA (Video Graphics Array) connector, a composite video connector, an S-Video (Separate Video) connector, or a component video connector. The output power connector 320 may be utilized as the power connector 201 shown in FIG. 2. The video server internal circuitry 310 may include application circuitry of the video server 300, such as analog-to-digital converters, video encoder circuits, and network circuits for digitizing a video signal received from the CCTV camera 210, encoding the digitized video signal, and transmitting the encoded video signal to a networked device. The network connector 330 may be an RJ-45 connector, and may comprise a plurality of wire pairs 331, 332, 333, and 334. The wire pair 331 may correspond to pins 4 and 5 of the RJ-45 connector, and may be a spare pair. The wire pair 332 may correspond to pins 1 and 2 of the RJ-45 connector, and may be a signal pair. The wire pair 333 may correspond to pins 3 and 6 of the RJ-45 connector, and may be a signal pair. The wire pair 334 may correspond to pins 7 and 8 of the RJ-45 connector, and may be a spare pair. The wire pair 332 may be utilized as a receiving pair, and the wire pair 333 may be utilized as a transmitting pair. The wire pair 332 may also be utilized as the transmitting pair, and the wire pair 333 may also be utilized as the receiving pair. The PoE interface 360 may be connected to the network connector 330 through the plurality of wire pairs 331, 332, 333, and 334. The wire pair 332 may be electrically connected to a primary winding 361A of a first transformer, and the wire pair 333 may be electrically connected to a primary winding 362A of a second transformer. The first transformer may comprise the primary winding 361A and a secondary winding 361B. The second transformer may comprise the primary winding 362A and a secondary winding 362B. The first transformer may be utilized to split power, e.g. direct current, on the wire pair 332 from data signals on the wire pair 332. The second transformer may be utilized to split power, e.g. direct current, on the wire pair 333 from data signals on the wire pair 333. The primary winding 361A may have a first terminal electrically connected to a first wire of the wire pair 332, and a second terminal electrically connected to a second wire of the wire pair 332. The primary winding 362A may have a first terminal electrically connected to a first wire of the wire pair 333, and a second terminal electrically connected to a second wire of the wire pair 333. The second DC/DC converter 365 of the PoE interface 360 may receive power by tapping a center-tap of the primary winding 361A and a center-tap of the primary winding 362A to receive a first voltage source, e.g. 48 Volts. The center-tap of the first transformer and the center-tap of the second transformer may form a current circuit. The center-tap of the first transformer may form a first voltage level. The center-tap of the second transformer may form a second voltage level. Voltage difference between the first voltage level and the second voltage level may then be used to form the first voltage source, e.g. 48 Volts.

The second DC/DC converter 365 may have a first input terminal electrically connected to the center-tap on the primary winding 361A, and a second input terminal electrically connected to the center-tap on the primary winding 362A. Then, the second DC/DC converter 365 may convert the first voltage source to a second voltage source, e.g. 12 Volts, and a third voltage source, e.g. 5 Volts, for powering the video server internal circuitry 310. In addition to receiving the second voltage source and the third voltage source from the PoE interface 360, the video server internal circuitry 310 may also transmit and receive data to and from the second transformer and the first transformer of the PoE interface 360, respectively.

To provide power to the CCTV camera 210, the first DC/DC converter 340 may also tap the primary windings 361A, 362A of the first transformer and the second transformer to receive the first voltage source at a first input terminal and a second input terminal, respectively, of the first DC/DC converter 340. Then, the first DC/DC converter 340 may convert the first voltage source to a fourth voltage source, e.g. 12 Volts, and output the fourth voltage source at an output terminal of the first DC/DC converter 340. The fourth voltage source may then be provided to the CCTV camera 210 through the output power connector 320. The over-current protection circuit 350 may be electrically connected between the output terminal of the first DC/DC converter 340 and an input terminal of the output power connector 320 for protecting the CCTV camera 210 from an over-current event in the fourth voltage source. It should be noted that, while preferably both the first and second DC/DC converters 340, 365 are utilized in the video server 300, the first DC/DC converter 340 may be optional, and the second DC/DC converter 365 may be utilized to power the CCTV camera 210 through the over-current protection circuit 350 and the output power connector 320. The second voltage source of the second DC/DC converter 365 may be utilized for powering the CCTV camera 210. However, it is preferable to have both the first DC/DC converter 340 and the second DC/DC converter 365. Powering the CCTV camera 210 through the second DC/DC converter 365 may cause noise in the second and third voltage sources, and if the CCTV camera 210 draws too much current, the video server internal circuitry 310 may be starved of current, causing failures. By utilizing the first DC/DC converter 340, the CCTV camera 210 may draw power from the first DC/DC converter 340 without affecting operation of the video server internal circuitry 310.

Figure 4:
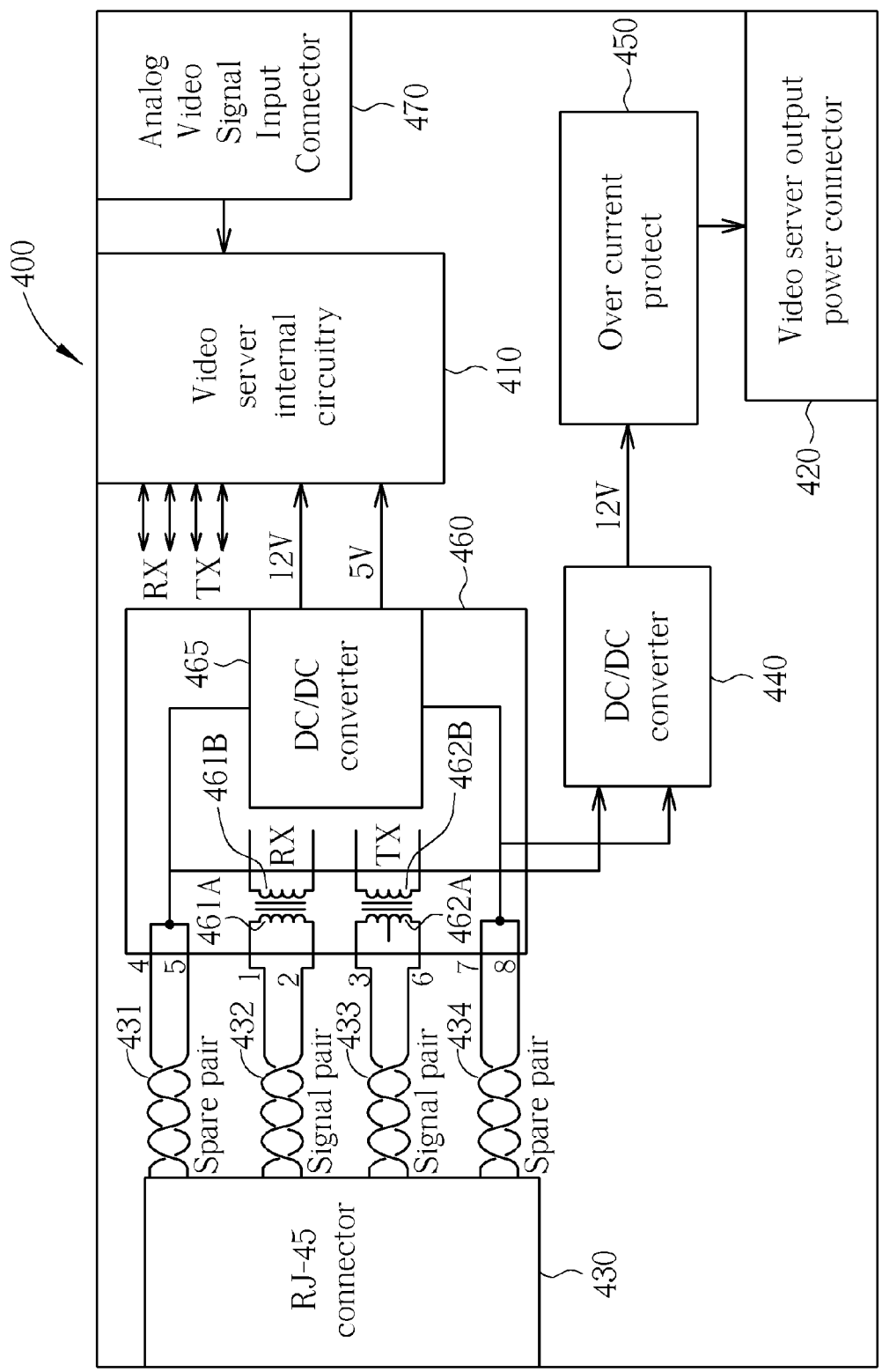
FIG. 4 is a diagram of a second embodiment of the video server of FIG. 2.

Please refer to FIG. 4, which is a diagram of a video server 400 according to a second embodiment. The video server 400 may utilize a second PoE architecture different from that used by the video server 300, in that data and power signals in the second PoE architecture are not sent over single signal pairs. Instead, the second PoE architecture provides data signals on two signal pairs, and power signals on two spare pairs, as described below. The video server 400 may be utilized as the video server 200 in the networked camera system shown in FIG. 2. The video server 400 may comply with the Power over Ethernet (PoE) standard described above, and may comprise video server internal circuitry 410, an output power connector 420, a network connector 430, a first DC/DC converter 440, an over-current protection circuit 450, and a PoE interface 460. The video server 400 may further comprise an analog video signal input connector 470 electrically connected to the video server internal circuit 410 and the CCTV camera. The analog video signal input connector 470 may be a VGA (Video Graphics Array) connector, a composite video connector, an S-Video (Separate Video) connector, or a component video connector. The output power connector 420 may be utilized as the power connector 201 shown in FIG. 2. The video server internal circuitry 410 may include application circuitry of the video server 400, such as analog-to-digital converters, video encoder circuits, and network circuits for digitizing a video signal received from the CCTV camera 210, encoding the digitized video signal, and transmitting the encoded video signal to a networked device. The network connector 430 may be an RJ-45 connector, and may comprise a plurality of wire pairs 431, 432, 433, and 434. The wire pair 431 may correspond to pins 4 and 5 of the RJ-45 connector, and may be a spare pair. The wire pair 432 may correspond to pins 1 and 2 of the RJ-45 connector, and may be a signal pair. The wire pair 433 may correspond to pins 3 and 6 of the RJ-45 connector, and may be a signal pair. The wire pair 434 may correspond to pins 7 and 8 of the RJ-45 connector, and may be a spare pair. The wire pair 432 may be utilized as a receiving pair, and the wire pair 433 may be utilized as a transmitting pair. The wire pair 432 may also be utilized as the transmitting pair, and the wire pair 433 may also be utilized as the receiving pair. The PoE interface 460 may be connected to the network connector 430 through the plurality of wire pairs 431, 432, 433, and 434. The PoE interface 460 may be electrically connected to the network connector 430 for merging the first spare wire pair 431 into a first trace carrying the power signal, and merging the second spare wire pair 434 into a second trace carrying the power signal. The first trace and the second trace form a current circuit. The wire pair 432 may be electrically connected to a primary winding 461A of a first transformer, and the wire pair 433 may be electrically connected to a primary winding 462A of a second transformer. The first transformer may comprise the primary winding 461A and a secondary winding 461B. The second transformer may comprise the primary winding 462A and a secondary winding 462B. The primary winding 461A may have a first terminal electrically connected to a first wire of the wire pair 432, and a second terminal electrically connected to a second wire of the wire pair 432. The primary winding 462A may have a first terminal electrically connected to a first wire of the wire pair 433, and a second terminal electrically connected to a second wire of the wire pair 433. A second DC/DC converter 465 of the PoE interface 460 may receive power from the wire pair 431 and the wire pair 434 through the first trace and the second trace to receive a first voltage source, e.g. 48 Volts. The first trace may form a first voltage level. The second trace may form a second voltage level. Voltage difference between the first voltage level and the second voltage level may then be used to form the first voltage source, e.g. 48 Volts.

The second DC/DC converter 465 may have a first input terminal electrically connected to the wire pair 431 through the first trace, and a second input terminal electrically connected to the wire pair 434 through the second trace. Then, the second DC/DC converter 465 may convert the first voltage source to a second voltage source, e.g. 12 Volts, and a third voltage source, e.g. 5 Volts, for powering the video server internal circuitry 410. In addition to receiving the second voltage source and the third voltage source from the PoE interface 460, the video server internal circuitry 410 may also transmit and receive data to and from the second transformer and the first transformer of the PoE interface 460, respectively.

To provide power to the CCTV camera 210, the first DC/DC converter 440 may also receive power from the first trace and the second trace to receive the first voltage source at a first input terminal and a second input terminal, respectively, of the first DC/DC converter 440. Then, the first DC/DC converter 440 may convert the first voltage source to a fourth voltage source, e.g. 12 Volts, and output the fourth voltage source at an output terminal of the first DC/DC converter 440. The fourth voltage source may then be provided to the CCTV camera 210 through the output power connector 420. The over-current protection circuit 450 may be electrically connected between the output terminal of the first DC/DC converter 440 and an input terminal of the output power connector 420 for protecting the CCTV camera 210 from an over-current event in the fourth voltage source. It should be noted that, while preferably both the first and second DC/DC converters 440, 465 are utilized in the video server 400, the first DC/DC converter 440 may be optional, and the second DC/DC converter 465 may be utilized to power the CCTV camera 410 through the over-current protection circuit 450 and the output power connector 420. The second voltage source of the second DC/DC converter 465 may be utilized for powering the CCTV camera 210. However, it is preferable to have both the first DC/DC converter 440 and the second DC/DC converter 465. Powering the CCTV camera 210 through the second DC/DC converter 465 may cause noise in the second and third voltage sources, and if the CCTV camera 210 draws too much current, the video server internal circuitry 410 may be starved of current, causing failures. By utilizing the first DC/DC converter 440, the CCTV camera 210 may draw power from the first DC/DC converter 440 without affecting operation of the video server internal circuitry 410.

The video servers 300, 400 of the above embodiments include the first DC/DC converter 340, 440 and the output power connectors 320, 420 for providing convenient power connection with the CCTV camera 210, which makes installation more convenient and easier compared to the prior art, and also shortens length of a power cable utilized to connect the CCTV camera 210 to the output power connector 320, 420. The video servers 300, 400 are applicable to different PoE architectures, respectively, providing flexibility in application.

Those skilled in the art will readily observe that numerous modifications and alterations of the device and method may be made while retaining the teachings of the invention.

What is claimed is:

1. A video server device for receiving video signals from a CCTV camera and providing power to the CCTV camera, the video server device comprising:
   video server internal circuitry for digitizing a video signal received from the CCTV camera, encoding the digitized video signal, and transmitting the encoded video signal to a networked device;
   a network connector comprising:
      a first wire pair for carrying a first data signal and a first power signal;
      and a second wire pair for carrying a second data signal and a second power signal;
   an interface circuit comprising:

a first transformer for splitting direct current and data signals of the first wire pair;

a second transformer for splitting direct current and data signals of the second wire pair; and a second DC/DC converter having a first input terminal electrically connected to a center-tap of the first transformer, a second input terminal electrically connected to a center-tap of the second transformer, and an output terminal for outputting second and third voltage sources to the video server internal circuitry for powering the video server internal circuitry, the second DC/DC converter receiving a first voltage source through the first input terminal and the second input terminal;

a first DC/DC converter having a first input terminal electrically connected to a center-tap of the first transformer, a second input terminal electrically connected to a center-tap of the second transformer, and an output terminal for outputting a fourth voltage source; and an output power connector having an input terminal electrically connected to the output terminal of the first DC/DC converter for receiving the fourth voltage source, and an output terminal for providing the fourth voltage source to the CCTV camera.

2. The video server device of claim 1, further comprising: an over-current protection circuit having an input terminal electrically connected to the output terminal of the first DC/DC converter, and an output terminal electrically connected to the input terminal of the output power connector for preventing an over-current event in the fourth voltage source from damaging the CCTV camera.

3. The video server device of claim 1, wherein the network connector is an RJ-45 connector.

4. The video server device of claim 1, wherein the interface circuit is a Power over Ethernet (PoE) interface circuit.

5. The video server device of claim 1, wherein a primary winding of the first transformer is electrically connected to the first wire pair for splitting the first power signal and the first data signal.

6. The video server device of claim 5, wherein the first input terminal of the first DC/DC converter is electrically connected to the center-tap of the primary winding of the first transformer.

7. The video server device of claim 1, wherein a primary winding of the second transformer is electrically connected to the first wire pair for splitting the first power signal and the first data signal.

8. The video server device of claim 7, wherein the second input terminal of the first DC/DC converter is electrically connected to the center-tap of the primary winding of the second transformer.

9. A video server device for receiving video signals from a CCTV camera and providing power to the CCTV camera, the video server device comprising:

a video server internal circuitry for digitizing a video signal received from the CCTV camera, encoding the digitized video signal, and transmitting the encoded video signal to a networked device;

a network connector comprising:
a first wire pair for carrying first data signals;
a second wire pair for carrying second data signals; and
a first spare wire pair and a second spare wire pair for carrying power;

an interface circuit electrically connected to the network connector for merging the first spare wire pair into a first trace for carrying direct current at a first voltage level, and merging the second spare wire pair into a second trace for carrying direct current at a second voltage level, the interface circuit further comprising a second DC/DC converter having a first input terminal electrically connected to the first trace and a second input terminal electrically connected to the second trace for receiving the power in the form of a first voltage source and an output terminal for outputting a second and third voltage source to the video server internal circuitry for powering the video server internal circuitry;

a first DC/DC converter having a first input terminal electrically connected to the first trace and a second input terminal electrically connected to the second trace for receiving power, and an output terminal for outputting a fourth voltage source, wherein the first DC/DC converter converts voltage level between the first trace and the second trace to the fourth voltage source; and an output power connector having an input terminal electrically connected to the output terminal of the first DC/DC converter for receiving the fourth voltage source, and an output terminal for providing the fourth voltage source to the CCTV camera.

10. The video server device of claim 9, further comprising: an over-current protection circuit having an input terminal electrically connected to the output terminal of the first DC/DC converter, and an output terminal electrically connected to the input terminal of the output power connector for preventing an over-current event in the fourth voltage source from damaging the CCTV camera.

11. The video server device of claim 9, wherein the network connector is an RJ-45 connector.

12. The video server device of claim 9, wherein the interface circuit is a Power over Ethernet (PoE) interface circuit.

* * * * *